United States Patent [19]

Spielau et al.

[11] 4,319,004

[45] Mar. 9, 1982

[54] TERNARY THERMOPLASTIC MOLDING COMPOSITION CONTAINING POLYPROPYLENE HOMOPOLYMER

[75] Inventors: Paul Spielau, Troisdorf-Eschmar; Werner Kühnel, Nunkirchen-Schoneshof; Dietmar Welsch, Weissenburg; Gerd Klingberg, Lohmar; Hans E. Konermann; Wilfried Leeder, both of Troisdorf, all of Fed. Rep. of Germany

[73] Assignee: Dynamit Nobel Aktiengesellschaft, Troisdorf, Fed. Rep. of Germany

[21] Appl. No.: 249,467

[22] Filed: Mar. 31, 1981

[30] Foreign Application Priority Data

Apr. 2, 1980 [DE] Fed. Rep. of Germany ....... 3012805

[51] Int. Cl.³ .................... C08L 23/00; C08L 23/16; C08L 23/12; C08L 23/06
[52] U.S. Cl. ............................. 525/211; 525/240; 525/88
[58] Field of Search .................. 525/240, 211, 88

[56] References Cited

U.S. PATENT DOCUMENTS

| | | | |
|---|---|---|---|
| 3,517,086 | 6/1970 | Shirayama et al. | 525/240 |
| 3,919,358 | 11/1975 | Batiuic et al. | 525/240 |
| 4,251,646 | 2/1981 | Smith | 525/240 |

FOREIGN PATENT DOCUMENTS 2821342  11/1978  Fed. Rep. of Germany.

*Primary Examiner*—Carman J. Seccuro
*Attorney, Agent, or Firm*—Craig and Antonelli

[57] ABSTRACT

A ternary molding composition formed from an admixture of ethylene-propylene copolymer, polypropylene homopolymer, and polyethylene, which comprises 38–48% by weight of a partially crystalline ethylene-propylene copolymer with an ethylene content of at least 65% by weight, a melt index MFI (230/5) of 0.7–2.0 g/10 min, and a tensile strength of higher than 5.0 N/mm²; 27–63% by weight of a polypropylene homopolymer with a melt index MFI (230/5) of 25–65 g/10 min; and 3–30% by weight of polyethylene with a melt index MFI (230/5) of 15–20 g/10 min, the molding composition having a melt index MFI (230/5) of at least 8 g/10 min, a tensile strength of at least 15 N/mm² and an elongation at yield of at least 450%.

10 Claims, No Drawings

TERNARY THERMOPLASTIC MOLDING COMPOSITION CONTAINING POLYPROPYLENE HOMOPOLYMER

The invention relates to a ternary molding composition containing an ethylene-propylene copolymer, a propylene polymer, and polyethylene.

Polypropylene exhibits, besides several very advantageous properties such as, for example, a relatively low density, excellent resistance to higher temperatures and aqueous and non-aqueous liquids, also less favorable characteristics, such as inadequate impact strength at temperatures below room temperature, especially below 0° C. However, adequate impact strength is required and is of importance in many uses, such as, for example, for freight containers, suitcases, automobile parts, and similar produts. Polyethylene of high density, of which such molded articles are ordinarily made, does possess this satisfactory high impact strength, but shows a lower resistance to high temperatures.

Ethylene-propylene copolymers, the saturated ones as well as the unsaturated ones, exhibit, besides good mechanical properties, a high aging resistance and ozone resistance, as well as resistance to low temperatures, so that these copolymers are also excellently suitable, in particular, for usages where the product is exposed to weathering. Due to the elastomeric properties of these copolymers it is popular to combine such copolymers with harder polymers.

Many attempts have been made to combine the properties of polypropylene and/or polyethylene and/or ethylene-propylene copolymers by the production of binary or ternary molding compositions. It is known, for example, to utilize mixtures of polypropylene and polyethylene; however, these mixtures exhibit an impact strength which is hardly improved over polypropylene by itself. DOS Applications [German Unexamined Laid-Open Applications] Nos. 2,202,706 and 2,202,738 disclose blends of isotactic polypropylene and ethylene-propylene elastomers which are either partially crosslinked after blending by adding vulcanizing agents or wherein already partially crosslinked EPM (ethylene-propylene bipolymer) polymer is utilized during the manufacture. Such mixtures, however, still require improvement with respect to the tensile strength values, elongation at yield, tear propagation resistance, as well as the hardness values attainable, measured at 100° C., for many fields of usage, i.e. they do not satisfy the posed requirements for all applications.

Blends of polyethylene with EPDM (terpolyumers of ethylene-propylene and a non-conjugated diene) polymers, the crystallinity of which ranges between 10% and 20%, are known from U.S. Pat. No. 3,919,358. Such products, though exhibiting high tear strengths, do not show sufficient heat resistance due to the low melting temperature of polyethylene; also, permanent deformation, rigidity, and hardness are unsatisfactory.

DOS No. 2,732,969 discloses a binary molding composition of noncrosslinked ethylene-propylene sequence-type polymers with isotactic polypropylene. However, it has been found that such blends exhibit, depending on the composition, either inadequate cold flexibility or insufficient dimensional stability at high temperatures.

A ternary molding composition that is described in British Pat. No. 1,154,447, contains 50-90% by weight of crystalline polypropylene (insoluble in n-heptane to an extent of more than 90% by weight) and 5-30% by weight of polyethylene and 5-40% by weight of ethylene-propylene block copolymer (insoluble in n-heptane to an extent of 80% by weight). This composition when molded exhibits a tensile strength of only 10 N/mm$^2$ and is no longer flexible at temperatures below −30° C.

DOS No. 2,828,763 discloses a polypropylene molding composition of 90-60% by weight of polypropylene, 4-30% by weight of polyethylene, and 6-30% by weight of an elastomeric ethylene-propylene copolymer wherein the melt index of the elastomer mixture of ethylene-propylene copolymer and polyethylene to the melt index of the polypropylene is to have a ratio of 2-15 of the MFI (230/5) with respect to each other. The properties attainable with this molding composition still have very much to be desired, especially regarding, for example, the notch impact strength at very low temperatures, since products made therefrom, such as bumpers, for example, are nowise usable any longer at temperatures of −30° C. and therebelow and therefore, this molding composition is useless for this application, for example. Also, not all molding compositions show the desired, good processability in the injection-molding process, due to the fact that the melt index is much too low.

In contrast thereto, DOS No. 2,742,910 describes a thermoplastic mixture of elastomers containing 25-85% by weight of a practically amorphous ethylene-propylene copolymer and 15-75% by weight of a crystalline block copolymer of propylene and optionally additional polyethylene. AS set forth in DOS No. 2,821,342, this molding composition is in need of improvement regarding hardness, tensile strength, higher stability at high temperatures, and is excelled with respect to these properties, for example, by a molding composition according to DOS No. 2,821,342 as demonstrated in Tables 1 and 2 therein.

DOS No. 2,821,342 discloses thermoplastic elastomer mixtures containing 30-75 parts of a crystalline, isotactic propylene homopolymer and 25-70 parts of an essentially amorphous, elastomeric ethylene-propylene polymer, and maximally 15 parts of polyethylene, replacing the propylene homopolymer in proportion. These mixtures exhibit, in part, improved properties as compared with binary molding compositions, rendering the mixtures also more suitable for the manufacture of automobile bumpers. However, it has been found that, for extreme stresses, the mechanical properties of the elastomer mixtures known from DOS No. 2,821,342 still are in need of improvement, especially with regard to the notch impact strength, tensile strength and cold flexibility.

The invention is directed to the problem of providing a thermoplastic molding composition which exhibits high thermal stability, good mechanical properties, especially tensile strength values, high cold flexibility, i.e. notch impact strength at low temperatures, and which also can be pelletized and is, in its entirety, improved over the conventional binary and ternary molding compositions with respect to one or several properties. It is likewise an object of the invention to be able to manufacture with simple means such an optimally impact-strong ternary molding composition with desired properties which is not merely an accidental, concomitant result among many such results in conventional molding compositions. The desired molding composition should also be improved with respect to shrinkage tendences and is to be suitable, in particular, for use in injection molding.

It has now been found that the aforementioned objects can be optimally attained by a molding composition containing:

(a) 38–48% by weight of partially crystalline ethylene-propylene copolymer (i.e. either a bipolymer of ethylene and propylene or a terpolymer of ethylene, propylene and a non-conjugated diene) with an ethylene content of at least 65% by weight, a melt index MFI (230/5) of 0.7–2.0 g/10 min., and a tensile strength higher than 5.0 N/mm$^2$;

(b) 27–62% by weight of a propylene homopolymer. having a melt index MFI (230/5) of 15–50 g/10 min., and (c) 3–30% by weight of a polyethylene homopolymer having a melt index MFI (230/5) of 15–50 g/10 min., wherein the molding composition has a melt index MFI (230/5) of at least 8 g/10 min. a tensile strength of at least 15 N/mm$^2$ and an elongation at yield of at least 450%.

It is completely surprising, in view of the blends known from DOS No. 2,821,342, that it is possible by means of this invention to provide, with the use of partially crystalline ethylene-propylene copolymers with a tensile strength amounting to at least 5.0 N/mm$^2$, ternary molding compositions having a high impact strength, a high dimensional stability at high temperatures, a high notch impact strength even at low temperatures of −40° C., which molding compositions can additionally be processed excellently into injection-molded articles under avoidance of shrinkage.

As compared with the molding compositions of, for example, DOS No. 2,828,763, the invention can be realized in a simple way, since it shows a procedure according to which a ternary molding composition having the desired properties can be reliably created by selecting the components according to their melt indices and by maintaining specific weight proportions of the components in the molding composition. The invention differs over the polypropylene molding composition according to DOS No. 2,828,763 substantially also by its high proportion of ethylene-propylene copolymer, leading to a molding composition with properties improved as compared to the previously known molding compositions, which was not to be expected in the plurality of conventional molding compositions.

The characterization of the invention on the basis of the melt indices is also made because of the information contained therein regarding the flowability of the molding composition and thus its processability. The molding composition of this invention is to be processable, in particular, also by injection molding and therefore is to exhibit a melt index MFI (230/5) of approximately at least 8.

The molding composition of this invention is further distinguished by the fact that the ethylene-propylene copolymer (a) and the propylene homopolymer (b) together comprise 70–97% by weight of the molding composition. The ethylene-propylene copolymer (a) utilized exhibits preferably an ethylene content of more than 70% by weight. According to the invention, the partially crystalline ethylene-propylene copolymers are utilized which have a high strength and are also known as very high green strength elastomers. These ethylene-propylene copolymers can be pelletized and thus impart to the molding composition, in total, a processability advantage over the amorphous or almost amorphous ethylene-propylene copolymers which cannot be pelletized, as used e.g. in DOS No. 2,821,342. An ethylene-propylene copolymer (a) which is an ethylene propylene bipolymer and/or an ethylene-propylene-nonconjugated diene terpolymer is utilized for the molding composition. These copolymers are substantially block copolymers including small parts of random copolymers. The preferred copolymer (a) consists of 65–82% by weight of ethylene, 18–35% by weight of propylene, and 0–8% by weight of a non-conjugated diene tercomponent (third component). The tercomponent is normally dicyclopentadiene, an alkylidene norbornene (ethylidene norborne), an alkenyl norbornene, an alkadiene (hexadiene), or a cycloalkadiene (cyclohexadiene). Preferably, ethylene-propylene-diene terpolymers with a minimum tensile strength of 8.0 N/mm$^2$, preferably of a tensile strength ranging above 20 N/mm$^2$, are utilized for the molding composition according to the invention.

A further development of the invention provides to use proportionally, in place of the polypropylene homopolymer, an equivalent part of the propylene-ethylene copolymers with a melt index MFI (230/5) of between 15 and 50, preferably 20 and 40. The propylene-ethylene copolymers contain an ethylene content amounting to below 12% by weight.

The ternary molding composition of this invention is especially suitable for the preparation of technical molded components which, on the one hand, are exposed to high temperatures of up to 100° C., but also to very low temperatures of below −30° C., with the other mechanical properties showing balanced equally high level.

A preferred field of use is the production of bumpers for automobiles which must withstand impact stresses even at low temperatures down to −40° C. The molding composition of this invention also satisfies these extreme requirements inasmuch as it exhibits, on the one hand, a sufficient proportion of ethylene-propylene copolymer (a) to attain the necessary notch impact strength at low temperatures, which, however, is accompanied by a certain lowering of the dimensional stability at high temperatures. This lowering of the high-temperature dimensional stability is counteracted by using an amount according to this invention of selected propylene homopolymers (b), imparting to the molding composition improved mechanical properties at low temperatures and simultaneously a high dimensional stability at high temperatures. The melting ranges of the propylene homopolymers (b) are preferably 165° C. It has been found surprisingly that the third component (c), i.e. polyethylene, again raises the notch impact strength at low temperatures and has a positive effect on the shrinkage after removal from the mold. A polyethylene having an MFI (230/5) value of larger than 15, preferably, however, between 20 and 50, has proven to be especially advantageous; this polyethylene is contained in the molding composition in amounts of between 4 and 30 parts by weight, based on the molding composition, preferably 6–20% by weight. A high-density polyethylene is preferably utilized in this connection.

Preferred molding compositions of this invention, starting with the aforedescribed components with optimum properties, exhibit a ratio of the melt indices MFI of polyethylene (c) to the ethylene-propylene copolymer (a) equal to or larger than 15, preferably, however, larger than 25. In this connection, it is advantageous simultaneously to provide a ratio of melt indices of polyethylene (c) to propylene homopolymer (b) of between 0.25 and 3.0.

Molding compositions having a preferred formulation according to this invention contain 40–45% by weight of the ethylene-propylene copolymer (a), 35–58% by weight of the propylene polymer (b) and 5–20% by weight of polyethylene (d).

The ternary molding compositions of the invention can also be produced in a conventional way with the aid of the equipment customary for synthetic resins, such as rolls, extruders, mixers, and masticators, wherein all components can be mixed together simultaneously. The mixing step is to be preferably conducted at an elevated temperature, especially at a temperature of between 180° and 280°, with the use of shear forces.

Additionally, conventional additives, such as coloring agents, mold release agents, fillers, antioxidants, UV stabilizers, flame-retardants, fibers, or the like can be added to the molding composition of this invention.

It is also possible to add the ternary molding compositions of this invention to other synthetic resins, for example to improve the impact strength of the other synthetic resins.

The invention will be described below with reference to several examples along with comparative examples.

The following methods are utilized for testing of the properties:

"MFI (230/5) g/10 min." obtained according to DIN [German Industrial Standard 53735] or MFI (190/2.16).

"Notch impact strength" obtained according to DIN 53455 at various temperatures, un=broken, b=broken.

"Elongation at yield in %" obtained according to DIN 53455.

"Vicat softening temperature" indicated as VSTA°C.

Shrinkage measured after 48 hours of storage at room temperature, in mm.

"Tensile strength N/mm$^2$" according to DIN 53455.

EXAMPLE 1

A binary mixture, provided as a comparison, of 43 parts by weight of an EPDM (about 6% by weight hexadiene, 70% by weight of ethylene, and remainder propylene) having an MFI of 0.8% with 57 parts by weight of polypropylene homopolymer having an MFI of 55 is homogenized and processed into granules. The thus-formed granulated material is injection-molded at 220°–260° C. mass temperature to a molded article in the form of a bumper having a required length of 1436 mm upon removal from the injection mold. By storage at room temperature, a dimensional reduction (shrinkage) of the molded article occurs. After 48 hours, the bumper has only a length of 1435.5 mm, i.e. a shrinkage of −0.5 mm with respect to the desired length.

Additional properties are indicated in the table following Examples.

EXAMPLE 2

A mixture, provided as a comparison, of 40 parts by weight of an EPDM having an MFI of 0.8 (same as used in Example 1) is homogenized as in Example 1 with 50 parts by weight of a polypropylene homopolymer with an MFI of 55 and 10 parts by weight of a propylene-ethylene copolymer (containing less than 12% of ethylene) having an MFI of 25, and made into granules. A bumper produced from this granulated material under the same injection-molding conditions as set forth in Example 1 shows, after 48 hours of storage, a length of −1.5 mm as compared to the required length. This example demonstrates that even a small amount of a propylene copolymer results in an increased shrinkage of the molded article. Additional properties are shown in the table.

EXAMPLE 3

A binary mixture of 48 parts by weight of EPDM (same as in Example 1) with an MFI of 0.8 and 52 parts by weight of a polypropylene-homopolymer with an MFI of 55, made for comparison purposes, is injection-molded as in Example 1 to a molded article. After storing the molded article at room temperature for a period of 48 hours after removal from the injection mold, the product shows a shrinkage of ±0 as compared to the required length.

Additional properties of this binary molding composition are listed in the table.

EXAMPLE 4

A ternary molding acomposition according to the invention is produced from 43 parts by weight of EPDM with an MFI of 0.8 and 47 parts by weight of polypropylene homopolymer with an MFI of 25 and 10 parts by weight of polyethylene with an MFI of 30, and injection-molded into a bumper as described in Example 1. After 48 hours of storage at room temperature, the bumper shows a shrinkage of ±0 as compared to the required length.

Additional data, see table.

EXAMPLE 5

As a comparative example, Example 2 of Table 2 from German Pat. No. 2,821,342 was incorporated. In this case, a mixture is produced from 45 parts by weight of an amorphous EPDM (crystallinity below 0.25% and Mooney viscosity [ML$_{1+4}$] 125° C. of 52) with a tensile strength of 6.5 N/mm$^2$ and 50 parts by weight of propylene homopolymer with a density of 0.905 g/cm$^3$ and an MFI (230/2.16) of 5.2 dg/min corresponding to an MFI (230/5) of 21, and 5 parts by weight of polyethylene with a density of 0.963 g/cm$^3$, MFI (190/2.16) of 8, and pressed into a panel. However, this panel shows, with a tensile strength of 10.0 N/mm$^2$, elongation at yield 150%, very moderate mechanical properties which also indicate a poor cold flexibility.

EXAMPLE 6

Another comparative example from DOS No. 2,821,342, Table 6, Example 1, consists in a molding composition containing 40 parts by weight of EPDM as described in Example 5, 55 parts by weight of polypropylene homopolymer as described in Example 5, and 5 parts by weight of a polyethylene as described in Example 5. This mixture, though exhibiting an improvement of mechanical properties as compared with Example 5 due to the properties of high-density polyethylene, is not suitable for injection-molding in view of a total MFI (230/5) of 5.2 g/10 min.

EXAMPLE 7

As a further comparative example, Example 4 of Table 7 is incorporated from DOS No. 2,821,342. In this case, a slightly crystalline EPDM with high tensile strength of 12.0 N/mm$^2$, crystallinity 3%, is used in an amount of 40 parts by weight, and processed with 55 parts by weight of polypropylene as in Example 8 and 5 parts by weight of polyethylene as in Example 5. A product is obtained having substantially poorer mechanical properties than that of Example 6, and the molding composition likewise does not lend itself well to injection molding (MFI 6.5).

EXAMPLE 8

As described in Example 1, a mixture according to this invention is prepared from 42 parts by weight of EPM (a block copolymer having some random copolymer parts and containing 70% by weight of ethylene and 30% by weight of propylene) with an MFI of 0.9 and 48 parts by weight of polypropylene homopolymer with an MFI of 48 and 10 parts by weight of polyethylene with an MFI of 30, and injection-molded into a bumper. The latter shows, after 48 hours of storage at room temperature, a shrinkage of ±0 mm as compared with the desired length. Additional data can be found in the table.

with other, poor values. The many comparative examples numbered 1-3, 5-7 show clearly that respectively one or several of the desired properties are inadequate to satisfy the requirement profile according to the invention, and that the invention according to Examples 4 and 8, is the sole means for providing a good and very good characteristic in all desired properties.

Examples 1 and 3 demonstrate that binary thermoplastic mixtures of EPDM and polypropylene homopolymer, with too low a content of EPDM, do not exhibit sufficient cold flexibility (Example 1) and, with a higher content of EPDM, show a low dimensional stability under heat (Example 3). It is impossible to optimize the desired properties.

Example 2 shows that, by adding propylene-ethylene copolymers to mixtures according to Example 1, an adverse effect is exerted on the shrinkage of the molded components, i.e. such shrinkage is aggravated, while

| Example | EPDM EPM Parts by Wt. +MFI +Tens. Str. | PP-H Parts by Wt. MFI | PP-CO Parts by Wt. MFI | PE Parts by Wt. MFI 190/2.16 | MFI of Mixture 230/5 | Vicat °C. | Elong. at Yield % | Tensile Strength N/mm² | Notch Impact Strength °C. −20° C. −40° C. | | | Shrinkage mm | Evaluation Vicat | Notch Impact Str. | Shrinkage |
|---|---|---|---|---|---|---|---|---|---|---|---|---|---|---|---|
| 1 | 4.3 / 0.8 / 24.8 | 57 / 55 | | | 17 | 107 | 550 | 28 | un | b | b | −0.5 | good | very poor | good |
| 2 | 40 / 0.8 / 24.8 | 50 / 55 | 10 / 25 | | 15 | 106 | 576 | 28.7 | un | b | b | −1.5 | good | very poor | poor |
| 3 | 48 / 0.8 / 24.8 | 52 / 55 | | | 13.2 | 95 | 610 | 20.7 | un | un | b | ±0 | poor | good | good |
| 4 | 43 / 0.8 / 24.8 | 47 / 25 | | 10 / 7 | 14.6 | 100 | 640 | 29.8 | un | un | un | ±0 | good | very good | good |
| 5 | 45 / — / 6.5 | 50 / 21 | | 5 / 8 | | | 150 | 10.0 | | | | | | moderate | |
| 6 | 40 / — / 6.5 | 55 / 21 | | 5 / 8 | 5.2 | | 430 | 21.3 | | b | | | | | |
| 7 | 40 / — / 12 | 55 / 21 | | 5 / 8 | 6.5 | | 130 | 12.4 | | | | | | | |
| 8 | 42 / 0.9 / 5.8 | 48 / 48 | | 10 / 7 | 14.1 | 101 | 630 | 23 | un | un (−30° C.) un | b | ±0 | good | good | good |

Commentary on Table

The table contains a compilation and supplement of the aforedescribed examples with the most important properties indicating data regarding the desired profile of required properties for technical parts under high stresses such as bumpers, for example.

The MFI of the total mixture is an indication of the flow properties and thus of the suitability for injection-molding processing; in this connection, MFI values starting with about 8 are a hardstick for good processability. The Vicat value stands for good dimensional stability under heat; elongation and tensile strength indicate the general mechanical properties, notch impact strength is a measure for cold flexibility at extremely low temperatures, and the shrinkage is a measure for the quality and dimensional stability of the molded articles producible by injection molding. The evaluation set forth in the table is made with the objective of providing a high requirement profile of several properties. It can clearly be seen from the table that frequently unilaterally high property values are coupled otherwise there are no improvements in the desired property values, either.

Example 4 of a molding composition according to this invention shows for the first time a balanced spectrum of properties with good and very good values regarding mechanical properties, cold flexibility, shrinkage, injection-moldability, and dimensional stability under heat. The same holds true for Example 8 according to this invention, wherein the molded component still withstands the notch impact strength test at −30° C.

Examples 5, 6 and 7 show conventional ternary molding compositions on the basis of amorphous or almost amorphous ethylene-propylene polymers which result in a spectrum of properties which considerably deviates from that of the invention; in particular, they clearly show their poor processability in the injection-molding process and their moderate mechanical properties, such as elongation at yield and tensile strength. The invention is always superior to these molding compositions. In particular, the wide scattering of the characteristic values of the properties is striking, making it impossible to effect a controlled selection of a molding composition having the desired properties.

What is claimed is:

1. A ternary molding composition formed from an admixture of ethylene-propylene copolymer, polypropylene homopolymer, and polyethylene, which comprises:
   (a) 38-48% by weight of a partially crystalline ethylene-propylene copolymer with an ethylene content of at least 65% by weight, a melt index MFI (230/5) of 0.7-2.0 g/10 min, and a tensile strength of higher than 5.0 N/mm$^2$,
   (b) 27-62% by weight of polypropylene homopolymer with a melt index MFI (230/5) of 25-65 g/10 Min, and
   (c) 3-30% by weight of polyethylene with a melt index MFI (230/5) of 15-20 g/10 min, the molding composition having a melt index MFI (230/5) of at least 8 g/10 min, a tensile strength of at least 15 N/mm$^2$ and an elongation at yield of at least 450%.

2. A molding composition according to claim 1, wherein the ethylene-propylene copolymer and polypropylene homopolymer together comprise 70-97% by weight of the molding composition.

3. A molding composition according to one of claims 1 or 2, wherein instead of a part of polypropylene homopolymer, proportionately a part of propylene-ethylene copolymer is provided, having a melt index MFI (230/5) of 15-50, preferably between 20 and 40 g/10 min.

4. A molding composition according to claim 3, wherein a propylene-ethylene copolymer is provided with an ethylene content below 12% by weight.

5. A molding composition according to one of claims 1-4, wherein a polyethylene is provided with a melt index MFI (230/5) of between 20 and 40 g/10 min.

6. A molding composition according to claim 1, wherein the ethylene-propylene copolymer comprises an ethylene-propylene copolymer and/or an ethylene-propylene terpolymer containing
   65-82% by weight of ethylene
   18-35% by weight of propylene
   0-8% by weight of a diene tercomponent.

7. A molding composition according to claim 6, wherein the ethylene-propylene copolymer has an ethylene content of more than 70% by weight.

8. A molding composition according to claim 7, wherein an ethylene-propylene terpolymer is provided having a tensile strength of at least 8.0 N/mm$^2$, preferably higher than 20 N/mm$^2$.

9. A molding composition according to claim 1, wherein the composition contains 40-45% by weight of ethylene-propylene copolymer, 35-58% by weight of polypropylene homopolymer, and 5-20% by weight of polyethylene.

10. A bumper for an automobile made by injection molding from the molding composition of claim 1.

* * * * *